United States Patent [19]

Kurita et al.

[11] Patent Number: 4,809,953
[45] Date of Patent: Mar. 7, 1989

[54] BELT TIGHTENER

[75] Inventors: Yasuo Kurita; Masaaki Kokabu; Katsunori Uemoto, all of Osaka, Japan

[73] Assignee: Ashimori Industry Co., Ltd., Osaka, Japan

[21] Appl. No.: 126,850

[22] Filed: Nov. 30, 1987

[51] Int. Cl.$^4$ .................... F16G 11/12; B63B 25/24
[52] U.S. Cl. .................... 254/250; 24/68 CD
[58] Field of Search ............... 254/216, 243, 250, 251, 254/256, 261, 333, 371, 384; 410/11, 12, 20, 21, 100, 101, 103; 24/68 CD, 68 T, 69 CT, 170, 191

[56] References Cited

U.S. PATENT DOCUMENTS

| | | | |
|---|---|---|---|
| 3,099,055 | 7/1963 | Huber | 24/68 CD X |
| 4,395,796 | 8/1983 | Akaura et al. | 24/68 CD |
| 4,464,811 | 8/1984 | Holmes | 24/68 CD |
| 4,527,309 | 7/1985 | Kawahara | 24/68 CD |
| 4,610,055 | 9/1986 | Knox | 24/68 CD |

FOREIGN PATENT DOCUMENTS 61-49150  4/1986  Japan.
1318292  5/1973  United Kingdom ............ 24/68 CD Primary Examiner—Joseph J. Hail, III
Attorney, Agent, or Firm—Birch, Stewart, Kolasch, & Birch

[57] ABSTRACT

A belt tightener includes, in addition to a clasping mechanism for a belt to hold motor vehicles and other heavy loads firmly in a given position of transportation device such as a carrier vessel, a specific device for preventing the belt from loosening during its actual use under shaking conditions. The belt tightener can thus, be used advantageously to firmly tie down motor vehicles, cargo containers, heavy objects, and the like with a belt to fixing structures on carrier vessels while preventing the belt from loosening by external forces exerted during rough seas when the vessels are rolling and pitching.

1 Claim, 4 Drawing Sheets

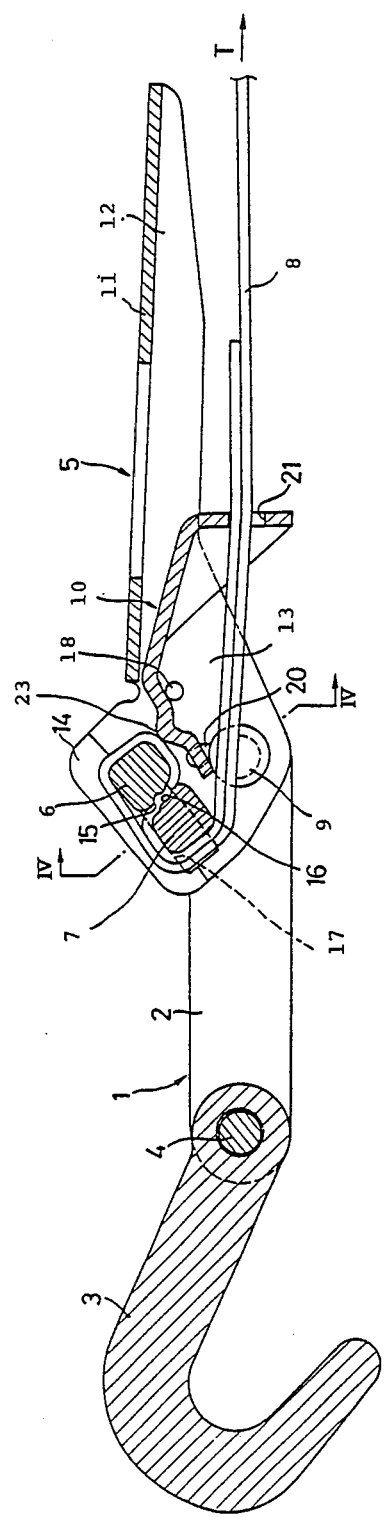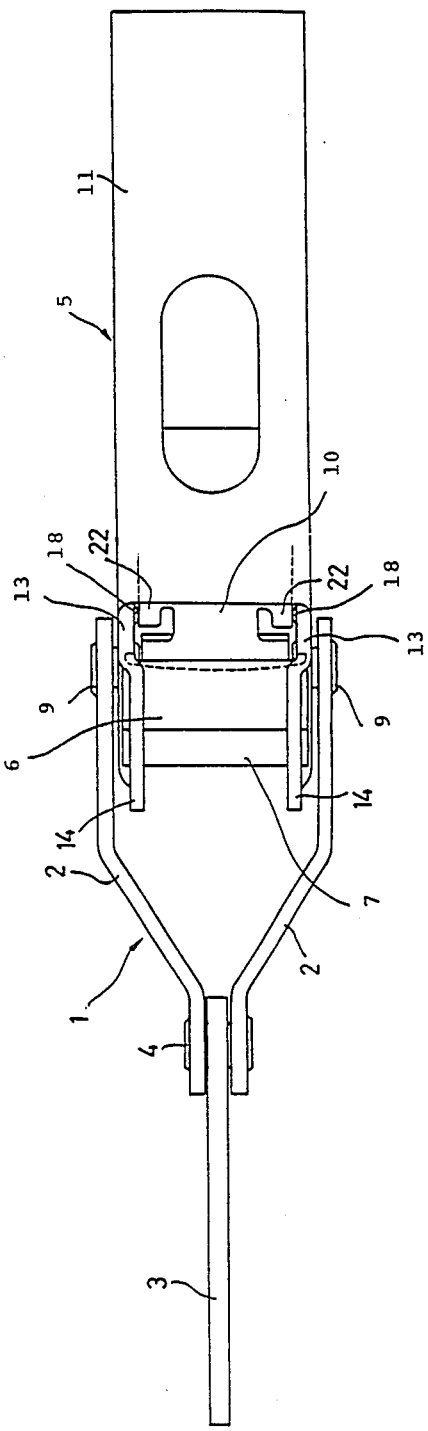

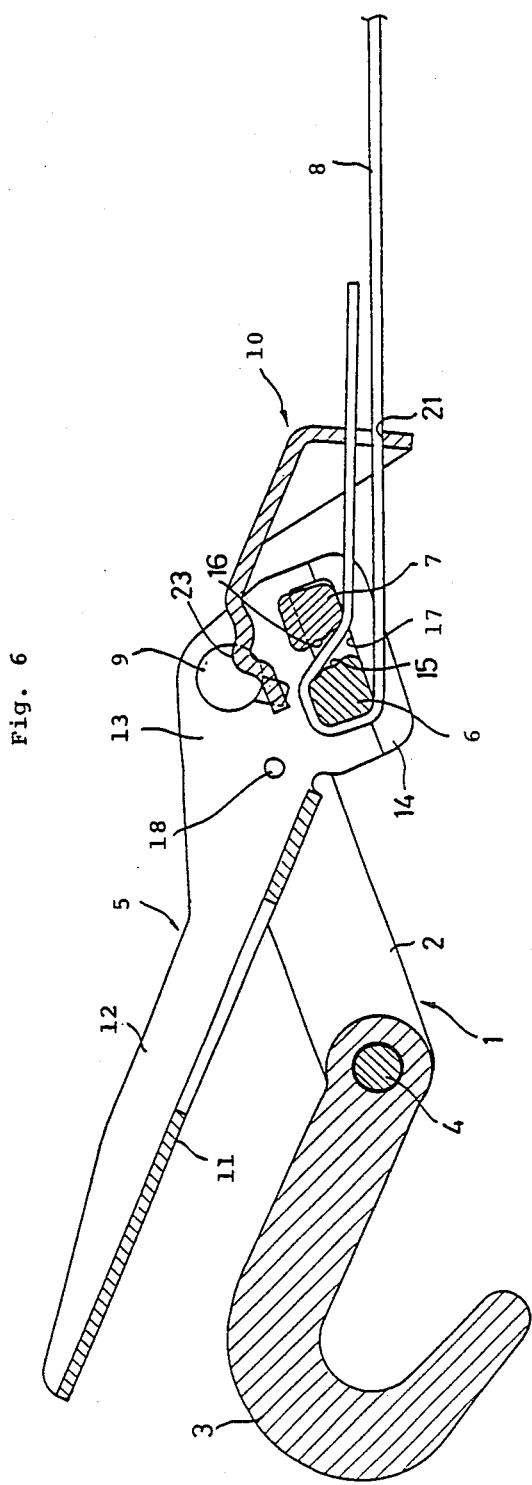

BELT TIGHTENER

BACKGROUND OF THE INVENTION

1. Field of the Invention

The present invention relates to a belt tightener for tightening a belt to firmly hold heavy loads in a given fastened position on a transportation means under a sufficient frictional tension force. More particularly, the present invention relates to a belt tightener wherein a combination of a supporting member and permanent fixed and sliding bars of a specific structure for frictionally tensioning a flexible belt is adopted to tie down heavy loads such as large cars, machines or cargo containers to fastening structures provided on a transportation means such as a carrier vessel or a cart. The belt tightener prevents any arbitrary movement of such heavy loads resulting from resulting in loosening of the holding belt due to shaking of the transportation means while the heavy loads are fastened thereto.

2. Description of the Prior Art

A variety of belt tighteners have previously been designed from the or tightly holding cargo and like objects in a given position of a transportation means. One of the recent models of this type is disclosed, for example, in Japanese Laid-open Utility Model Appln. No. Sho. 61-49150. In this belt tightener, a main body, a sub-body provided with a guide member, and a lever provided with two shafts fixed thereto are journaled mutually rotatably and a belt with one free end and a hook on the other end is inserted into the guide member and around the periphery of one of the shafts fixed to the lever, wound on the other shaft and pulled out through a space formed between the shafts, then through a clearance between the one shaft and the belt wound around the periphery thereof and finally through the guide member. When the lever is in an unlocked position, the belt can easily be introduced into the tightener through a sufficiently spread space between the shafts and pulled in either direction for locking or unlocking without any frictional resistance. When the lever is moved to its locked position, however, the belt is overlapped with each other around the other shaft whereby a frictional force is acted on the belt to tighten it. This belt tightener is widely used for holding heavy cargo such as motor vehicles to fastening structures of a transportation means such as a carrier vessel or cart.

However, the belt tightener of this type has a drawback that when this tightener is used to hold considerably heavy loads such as a large size motor vehicle in a given fastening position of a carrier vessel, the frictional force necessary to tension the belt becomes insufficient especially during rough seas when the vessel is significantly rolling or pitching. Thus inadvertent slackening of the belt by slipping occurs permitting very dangerous arbitrary movement of the heavy loads on the deck of the vessel.

Under the circumstances, there is a great demand in the field of transportation for developing a new type of belt tightener in which the above mentioned drawback is fully overcome.

BRIEF SUMMARY OF THE INVENTION

Accordingly, it is an object of the present invention to provide a belt tightener having a new mechanism for tensioning a belt which prevents the belt from being slackened by external force.

It is another object of the present invention to provide a belt tightener having a simple structure for firmly holding considerably heavy loads in a given position of a transportation means.

It is still another object of the present invention to provide a new belt tightener useful as a car-locking device for car carriers, especially for large size motor vehicles.

Other objects, features and advantages of the present invention will become more fully apparent from the following description.

According to the present invention, there is provided a belt tightener which comprises a body including a pair of spaced longitudinally extending side plates; a hook being journaled to one end of the body; an operating lever having a pair of spaced longitudinally extending side plates, a slot formed in each side plate, a permanently fixed bar, a sliding bar and a trunnion pin by which the operating lever is mounted to the body rotatably in either direction of locked and unlocked positions; a supporting member formed in approximately tip-bent L-shape and being rotatably supported by the operating lever; and a belt with one free end and with a hook on the other end being inserted in the free end portion around the permanently fixed bar and then pulled out through a clearance between the permanently fixed bar and the sliding bar; characterized in that the permanently fixed bar is laterally extended and is fixed at both side plates in the basal portion of the operating lever while the sliding bar is laterally extended slightly beyond both side plates of the operating lever and is engaged in the slots in such manner that the sliding bar is slidably movable within the range defined by the slots in the direction of approaching to or leaving from the permanently fixed bar, and that the supporting member has a projection capable of pressing the belt against the permanently fixed bar when the operating lever is moved in the locked position.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 2 is a longitudinal section view of the main part of the belt tightener shown in FIG. 1 in which the operating lever is held in a locked state;

FIG. 3 is a plan view of the belt tightener shown in FIG. 2;

FIG. 6 is a central longitudinal section view of the main part of the belt tightener shown in FIG. 1 in which the operating lever is held in an unlocked state.

In FIGS. 1, 2 and 6, the operating lever is rotatable in either direction. When the operating lever is rotated in a counter-clockwise direction in the drawing, the belt tightener is held in an unlocked state as shown in FIG. 6. When the operating lever is rotated in a clockwise direction in the drawing to a position almost parallel to the body as shown in FIGS. 1 and 2, the belt tightener is held in a locked state. In FIGS. 1, 2 and 6, a flexible belt is introduced into the belt tightener from the right end of the body. Accordingly, the right end of the main part of the tightener in these drawings is arbitrarily referred to herein as the front end and the left end as the rear end. For better understanding of the parts of the belt tightener, the same reference numerals are commonly used in these drawings.

DETAILED DESCRIPTION OF THE INVENTION

The belt used in the belt tightener of this invention is a conventional one. For example, a flexible belt made of a textile jacket woven or knitted with natural and/or synthetic fibers which may be incorporated with any conventional reinforcing material can be used. The belt tightener itself is usually made of steel or equivalent tough metals or alloys.

The present invention can more fully be understood from the following description taken in conjunction with the accompanying drawings.

Figure 1:
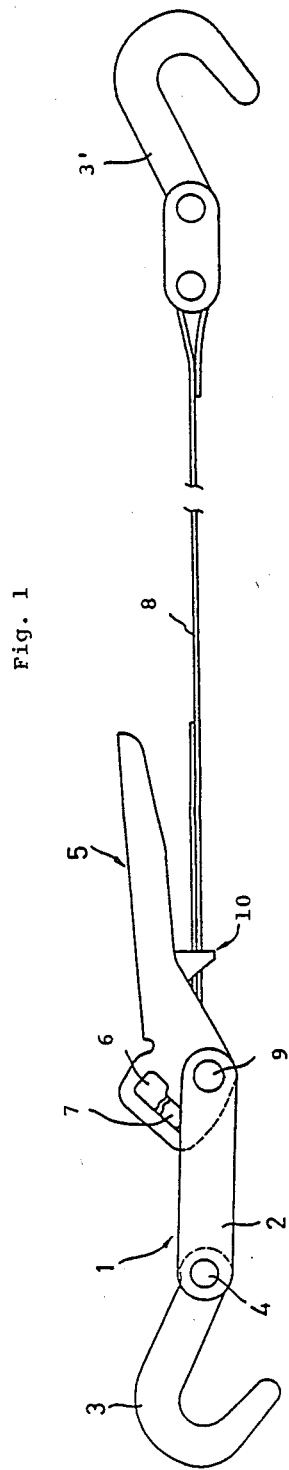
FIG. 1 is a side view of a preferable example of the belt tightener of the present invention in a locked state.

Referring to FIG. 1 wholly showing one example of the belt tightener of this invention, a body 1 comprises a pair of spaced parallel side plates 2,2 which are combined at the rear end and provided there with a conventional hook means 3 which is rotatable by means of a pin 4. The body 1 is provided at the front end thereof with an operating lever 5 having a permanently fixed bar 6 and a sliding bar 7. The body 1 contains a flexible belt 8 the free end of which has been introduced externally, passed around the periphery of the fixed bar 6 and pulled out. The other end of the belt 8 is connected to a hook means 3' which may be the same as the hook means 3. The operating lever 5 is rotatably mounted to the front end of the body 1 by means of a trunnion pin 9. Beneath the operating lever 5 in locked state, a supporting member 10 for supporting the belt 8 is mounted rotatably to the operating lever 5. A considerably heavy object such as a large size motor vehicle is clasped with the belt tightener provided at both ends with the hook means 3, 3' to a fastening device set in a given position of a carrier vessel.

Details of the structure and function of the belt tightener of this invention will become apparent from the following description referring to FIGS. 2–6.

In FIGS. 2 and 3, the body 1 comprised of a pair of spaced parallel side plates 2,2 combined at the rear end thereof to which the hook means 3 is rotatably mounted by means of the pin 4. The operating lever 5 comprises a cover plate 11 and a pair of spaced parallel side plates 12,12 extending vertically downward on opposite edges of the cover plate 11. Between the side plates 12,12 in their basal portions 13,13 are provided the laterally extending permanently fixed bar 6 and the laterally extending sliding bar 7 in such a manner that both ends of the permanently fixed bar 6 are fixed to the basal portions 13,13 while both ends of the sliding bar 7 extends slightly beyond the side plates 12,12 and engaged in elongated slots 17,17 formed in the baseal portion 13,13. Accordingly, the sliding bar 7 is slidably movable within the range defined by the elongated slots in the direction of approaching to or leaving from the permanently fixed bar 6. The basal portion 13,13 are further provided with stoper projections 18,18. The distance between the parallel side plates 12 and 12 and between their basal portions 13 and 13 is relatively larger than the width of the belt 8. However, the distance between the side plates 12,12 is narrowed in the position where the permanently fixed bar 6 and the sliding bar 7 exist and forms guide plates 14,14 the distance between which is only slightly larger than the width of the belt 8.

The permanently fixed bar 6 and the sliding bar 7 are almost square in their cross section and their surfaces facing each other 15 and 16 are shaped to have mutually engageable concavoconvex structure. This concavoconvex structure is preferably formed as teeth arranged in the longitudinal direction of the permanently fixed bar 6 and the sliding bar 7. The permanently fixed bar 6 and the sliding bar 7 are preferably processed by means of sand blasting or shot blasting to have a coarse surface.

The basal portion 13,13 of the operating lever 5 is rotatably mounted by trunnion pins 9,9 to the front ends of the side plates 2,2 of the body 1.

Figure 4:
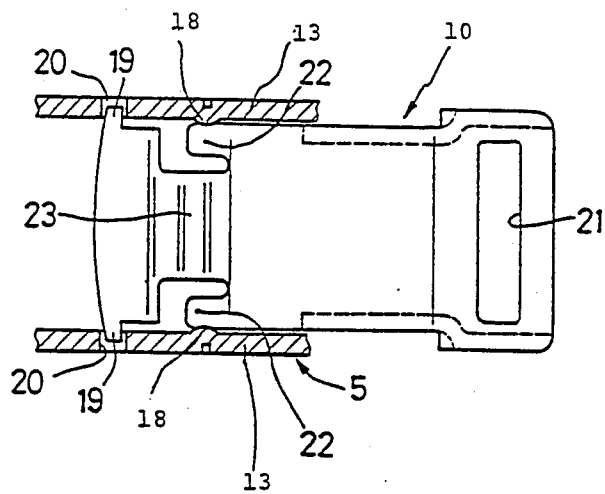
FIG. 4 is a plan view of the supporting member used in the belt tightener shown in FIGS. 1-3.

FIG. 4 shows a plan view of the supporting member 10 although FIG. 2 shows a longitudinal cross section and a partial structure of the supporting member 10. As is shown in FIG. 2, the supporting member 10 is in a tip-bent L-shape in cross section and is manufactured, for example, by die casting a metal or alloy to have such a shape. The supporting member 10 comprises a top plate the rear end of which is specifically bent as shown in FIG. 2. The front end of the supporting member is also bent simply downward and a pair of side plates in the form of a triangle extend downward from the opposite edges of the plate in the front portion. The downwardly bent top plate of the supporting member 10 at the front end has a laterally elongated opening as a belt-supporting portion 21 through which the belt 8 is inserted into the belt tightener. As shown in FIG. 4, both edges of the supporting member 10 at the rear end are protruded to form a pair of supporting protuberances 19,19 which are engaged in supporting openings 20,20 formed in the basal portion 13,13 of the operating lever 5 so that the supporting member 10 is mounted rotatably to the operating lever 5.

The supporting member 10 has one each side edge thereof a notch in an approximately L-shape as a stopper portion 22 which, on the movement of the operating lever 5 in clockwise direction to lock the belt 8, abuts against the stopper projection 18 located in the basal portion 13 of the operating lever 5 to stop the movement of the operating lever 5. A projection 23 is formed on the top plate of the supporting member 10 in the portion adjacent to the permanently fixed bar 6 and is allowed to abut against the belt 8 wound on the periphery of the permanently fixed bar 6 whereby the belt 8 is strongly pressed by the projection 23.

The belt 8 is first inserted through the belt-supporting portion 21 of the supporting member 10 and around the periphery of the sliding bar 7 and the permanently fixed bar 6, passed through a space formed between the permanently fixed bar 6 and the belt 8 around the sliding bar 7 and then pulled out through the belt-supporting portion 21 in overlapped state with the inserted belt.

Figure 5:
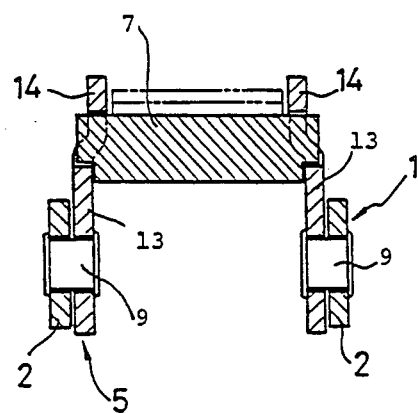
FIG. 5 is a section view of the belt tightener in locked state shown in FIG. 2 cut along line IV—IV.

In FIG. 5 showing the cross section of the belt tightener in locked state along the line IV—IV passing through the sliding bar 7 the state of the operating lever 5 being rotatably mounted to the body 1 and the relation in position between the operating lever 5, the body 1 and the sliding bar 7 can easily be understood. The body and the operating lever 5 are rotatably connected by means of the trunnion pin 9. The width of the operating lever 5 and the body 1 is sufficiently greater than that of the belt 8 so that the rotation of the operating lever 5 is effected without any damage of the belt 8.

In FIG. 6 showing the belt tightener in unlocked state, the operating lever 5 is rotated in a counter-clockwise direction with the trunnion pins 9,9 being actuated as a rotation axis whereby the permanently fixed bar 6 and the sliding bar 7 are positioned beneath the trunnion pins 9,9. In this state, the sliding bar 7 is positioned closely to the belt-supporting portion 21 rather than the permanently fixed bar 6 whereby the sliding bar 7 is moved along the slot 17 in the direction of spreading the space between the permanently fixed bar 6 and the sliding bar 7, thus making it possible to introduce or pull out the belt 8 without any frictional resistance for adjusting the length of the belt 8 from the free end to the fixed end.

In actual use of the belt-tightener of this invention, for example, for fixing a considerably heavy load such as a large size motor vehicle to a transportation means, the hook 3 mounted to the body 1 is engaged with a fixing structure on a carrier vessel or cart and the hook 3' fitted to the opposite end of the belt 8 is also engaged with another fixing structure through the considerably heavy object to be anchored. The free end of the belt 8 is then pulled to tension the belt in contact with the object. When the operating lever 5 is rotated in this state in counter-clockwise direction in the drawings for locking the belt, with the trunnion pin 9,9 being actuated as a rotation axis, the permanently fixed bar 6 and the sliding bar 7 existing beneath the trunnion pin 9 are moved upward while rotating in clockwise direction in the drawings, whereby the belt 8 at the fixed end is strongly tensioned. The rotated operating lever 5 is then supported by the supporting member 10 in such manner that the stopper projections 18,18 of the operating lever 5 are engaged with the stopper portions 22,22 of the supporting member 10. This state is shown by FIG. 1 and also by FIGS. 2–5.

When the belt tightener is held in its locked position, the belt 8 extending to the free end is pressed between the belt 8 extending to the fixed end and the sliding bar 7. Further, the sliding bar 7 moves along the slot 17 in the direction of approaching to the permanently fixed bar 6 by the tension applied to the belt 8 whereby the portion of the belt 8 between the permanently fixed bar 6 and the sliding bar 7 is pressed between both bars to create frictional force on the surface of the pemanently fixed bar 6 in contact with the surface of the belt 8 and on the surface of the sliding bar 7 in contact with the surface of the belt 8. When the belt 8 is tensioned in the direction of T in FIG. 2 by unexpected external force exerted, for example, by shaking of the transportation means, such frictional force prevents the movement of the belt 8 in the direction of T. As a concavoconvex structure is formed on the surface 15 of the permanently fixed bar 6 and on the surface 16 of the sliding bar 7, the action of preventing the movement of the belt 8 becomes stronger.

In addition to the frictional force exerted between the belt 8 and the bars 7 and 8, a frictional force 18 is also exerted to the belt 8 wound in overlapped state around the periphery of the slide bar 7. A frictional force is created on the surface of the outer belt in contact with the surface of the inner belt. This frictional force serves to prevent the movement of the belt in the direction of T in case an external force is exerted in the direction of T, i.e. in the direction of unlocking the belt.

In the belt tightener of this invention, the projection 23 formed on the supporting member 10 also functions as strong friction to the movement of the belt 8 in the direction of T when the operating lever 5 is held in locked position. When the belt 8 is pulled in the direction of T in locked state, the supporting member 10 is brought up whereby the projection 23 formed on the member 10 is pressed against the belt 8 to prevent the movement of the belt in the direction of T by friction created between the projection 23 and the belt 8.

In case the permanently fixed bar 6 and/or the sliding bar 7 is treated to have a coarse surface by means of sand blasting or shot blasting, the frictional resistance between these bars and the belt can further be increased to prevent loosening of the belt by external force. Accordingly, it is recommended to make the surface of these bars coarse.

The locked state as shown in FIG. 2 can easily be returned to the unlocked state by rotating the operating lever 5 in a clockwise direction. Thus, no special operation is necessary for the operation of the belt tightener of this invention.

According to this invention, frictional resistance of the belt can be increased remarkably by (1) the use of a sliding bar for interposing the belt between the permanently fixed bar and the sliding bar and (2) the use of projection on the supporting member, in addition to the use of overlapped belt as seen in the conventional belt tighteners. With the specific arrangement described above, this invention can provide a new type of belt tightener of simple structure which can apply high tension to the belt and maintain such tension even in a case of shaking or any other external force being applied to the belt. According to the belt tightener of this invention, a higher tension can be applied to the belt so that the tightener can be used for holding a considerably heavy load and for preventing the belt from loosening by external force.

It is to be construed that the present invention is not limited or restricted to the embodiments described hereinbefore and any modification, alteration and substitution can be made within the scope of the appended claim. Such variations are not to be regarded as a departure from the spirit and scope of the invention, and all such modifications as would be obvious to one skilled in the art are intended to be included within the scope of the following claims.

What is claimed is:

1. A belt tightener which comprises:
a body including a pair of spaced longitudinally extending side plates;
a hook being journaled to one end of the body;
an operating lever having a pair of spaced longitudinally extending side plates, a slot formed in each side plate, a permanently fixed bar, a sliding bar and a trunnion pin by which the operating lever is mounted to the body rotatably in either direction of locked and unlocked positions;

a generally L-shaped supporting member rotatably supported by the operating lever; and a belt with one free end and with a hook on the other end being inserted in the free end portion around the permanently fixed bar and the sliding bar;

said permanently fixed bar being laterally extended and being fixed at both side plates in a basal portion of the operating lever while the sliding bar is laterally extended slightly beyond both side plates of the operating lever and is engaged in the slots in such a manner that the sliding bar is slidably movable within the range defined by the slots in the direction of approaching to or leaving from the permanently fixed bar, and that the supporting member has a projection for pressing the belt against the permanently fixed bar when the operating lever is moved to the locked position.

* * * * *